US012573198B2

(12) United States Patent
Fujisaki et al.

(10) Patent No.: US 12,573,198 B2
(45) Date of Patent: Mar. 10, 2026

(54) COMMUNICATION SYSTEM, OUTPUT DEVICE, COMMUNICATION METHOD, OUTPUT METHOD, AND OUTPUT PROGRAM

(71) Applicant: NEC Corporation, Tokyo (JP)

(72) Inventors: Toshihiko Fujisaki, Tokyo (JP); Atsushi Kubo, Tokyo (JP); Masataka Sugimoto, Tokyo (JP); Makoto Kimoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 249 days.

(21) Appl. No.: 18/281,213

(22) PCT Filed: Feb. 4, 2022

(86) PCT No.: PCT/JP2022/004414
§ 371 (c)(1),
(2) Date: Sep. 8, 2023

(87) PCT Pub. No.: WO2022/196165
PCT Pub. Date: Sep. 22, 2022

(65) Prior Publication Data
US 2024/0153268 A1     May 9, 2024

(30) Foreign Application Priority Data
Mar. 15, 2021     (JP) ................................. 2021-040918

(51) Int. Cl.
G06V 10/94     (2022.01)
G06V 20/40     (2022.01)
G06V 40/20     (2022.01)
(52) U.S. Cl.
CPC .............. *G06V 20/41* (2022.01); *G06V 10/95* (2022.01); *G06V 40/28* (2022.01)

(58) Field of Classification Search
CPC ......... G06V 20/41; G06V 40/28; G06V 10/95
(Continued)

(56) References Cited

U.S. PATENT DOCUMENTS 7,120,880  B1 *  10/2006  Dryer ..................... G06Q 30/02
                                                                      715/831
12,211,317  B2 *  1/2025  Hernandez Rivera ......................
                                                                      G06V 20/46
(Continued)

FOREIGN PATENT DOCUMENTS

JP        2001-067482 A       3/2001
JP        2009-139667 A       6/2009
(Continued)

OTHER PUBLICATIONS

International Search Report for PCT Application No. PCT/JP2022/004414, mailed on Mar. 29, 2022.
(Continued)

*Primary Examiner* — Binh Kien Tieu
(74) *Attorney, Agent, or Firm* — Sughrue Mion, PLLC

(57) ABSTRACT

The participant terminal 80 includes imaging means 81 for shooting video of the participant who uses the participant terminal 80, frequency measurement means 82 for measuring the number of nods of the participant from the shot video, and action information transmission means 83 for transmitting action information that information of the participant is associated with the number of nods to the server 70. The server 70 includes transmission means 71 for transmitting the action information to the speaker terminal 90. The speaker terminal 90 includes participant output means 91 for outputting the information of the participant in order according to the number of nods included in the action information.

7 Claims, 4 Drawing Sheets

(58) Field of Classification Search
 USPC ...................................................... 348/14.08
 See application file for complete search history.

(56)                     References Cited

U.S. PATENT DOCUMENTS

| | | | | |
|---|---|---|---|---|
| 2004/0243416 A1* | 12/2004 | Gardos | ................... | G10L 15/25 |
| | | | | 704/275 |
| 2013/0054357 A1* | 2/2013 | Mager | .................... | G06Q 30/02 |
| | | | | 705/14.49 |
| 2020/0013402 A1* | 1/2020 | Kawano | ................. | G06F 3/167 |
| 2020/0359108 A1* | 11/2020 | Lee | ........................ | H04H 60/33 |
| 2022/0138470 A1* | 5/2022 | Seleskerov | .............. | H04N 7/15 |
| | | | | 382/159 |
| 2025/0118109 A1* | 4/2025 | Hernandez | ......... | H04L 12/1831 |

FOREIGN PATENT DOCUMENTS

| | | |
|---|---|---|
| JP | 2020-035003 A | 3/2020 |
| JP | 2020-194144 A | 12/2020 |
| JP | 2021-022909 A | 2/2021 |

OTHER PUBLICATIONS

JP Office Action for JP Application No. 2023-506846, mailed on Oct. 22, 2024 with English Translation.

* cited by examiner

COMMUNICATION SYSTEM, OUTPUT DEVICE, COMMUNICATION METHOD, OUTPUT METHOD, AND OUTPUT PROGRAM

This application is a National Stage Entry of PCT/JP2022/004414 filed on Feb. 4, 2022, which claims priority from Japanese Patent Application 2021-040918 filed on Mar. 15, 2021, the contents of all of which are incorporated herein by reference, in their entirety.

TECHNICAL FIELD

This invention relates to a communication system and a communication method for communicating with the other party through video, and an output device, an output method and an output program for outputting information of the other party.

BACKGROUND ART

In recent years, remote lectures and teleconferences (sometimes referred to as "remote lectures/conferences") using communication lines have been used to enable communication with other parties regardless of location. In the remote lectures/conferences, video and audio are transmitted and received to enable communication between the two parties. Various methods have been proposed for conducting such remote lectures/conferences.

Patent literature 1 describes a remote lecture system using a communication network. The system described in patent literature 1 monitors changes in the information used for a nomination order calculation process, such as entering or leaving a lecture, raising a student's hand, etc., and updates a nomination order list based on change information received when there is a change.

In addition, patent literature 2 describes a system for surveying and evaluating audience reactions. The system described in patent literature 2 recognizes the reaction of a person in a video, and detecting stable-stationary state and active state to recognize the reaction of the person.

CITATION LIST

Patent Literature

PTL 1: Japanese Patent Application Laid-Open No. 2009-139667
PTL 2: Japanese Patent Application Laid-Open No. 2001-67482

SUMMARY OF INVENTION

Technical Problem

The remote lectures/conferences, like in-person lectures and conferences, are required to conduct according to understanding of the participants in the lecture or conference. In a in-person lecture or conference, the speaker can look around the classroom or conference room and infer the reaction and level of understanding to explained contents based on their facial expressions and behavior of attendees (participants). However, in the case of remote lectures and conferences, the number of participants is expected to be large, and it is practically difficult to read the facial expressions of all participants on the screen and infer their reactions and level of understanding, because it takes time and effort.

When the usefulness of the lecture or conference is to be confirmed by the speaker, a method for confirming individually is conceived, such as a method of receiving notification from the participants individually using the remote lecture/conference system, or collecting surveys after the end of the lecture or conference. In addition, when a participant wishes to speak, the participant can request to speak by raising his/her hand in a in-person lecture or conference. However, when using a remote lecture/conference system, it is necessary to require complicated procedures for the participant, as he or she needs to operate the "raise your hand button" or other buttons provided by the system.

At the same time, in order to determine level of understanding of participants according to the lecture or conference, remarks from the participants are an essential element to make the lecture or conference more meaningful. Therefore, it is preferable to encourage participants to speak up according to their level of understanding of the lecture or conference without bothering them.

In the system described in patent literature 1, the order in which students are nominated is determined based on the terminal operation time and nomination information indicating raised students' hands obtained from the video. However, it is difficult to grasp the level of understanding of students only by information indicating a raised hand. In addition, as in the system described in patent literature 2, it is also difficult to grasp the level of understanding of a person in the video by simply recognizing response of the person, as is the case with the system described in patent literature 1.

Therefore, it is an object of the present invention to provide a communication system, an output device, a communication method, an output method, and an output program that can express participants who should be prompted to speak without bothering the participants when a lecture or conference is proceeded by video through communication.

Solution to Problem

The communication system according to the present invention includes participant terminals used by participants of a lecture or conference, a speaker terminal used by a speaker of the lecture or conference, and a server, wherein the participant terminal includes imaging means for shooting video of the participant who uses the participant terminal, frequency measurement means for measuring the number of nods of the participant from the shot video, and action information transmission means for transmitting action information that information of the participant is associated with the number of nods to the server, wherein the server includes transmission means for transmitting the action information to the speaker terminal, and wherein the speaker terminal includes participant output means for outputting the information of the participant in order according to the number of nods included in the action information.

The output device according to the present invention includes input means for inputting for each participant the number of nods of a participant measured from shot video of the participant, and participant output means for outputting information of the participant in order according to the number of nods.

In the communication method according to the present invention, a participant terminal used by a participant of a lecture or conference shoots video of the participant who uses the participant terminal, the participant terminal measures the number of nods of the participant from the shot video, the participant terminal transmits action information that information of the participant is associated with the number of nods to a server, the server transmits the action information to a speaker terminal used by a speaker of the lecture or conference, and the speaker terminal outputs the information of the participant in order according to the number of nods included in the action information.

In the output method according to the present invention, a computer inputs for each participant the number of nods of a participant measured from shot video of the participant, and the computer outputs information of the participant in order according to the number of nods.

The output program according to the invention causes a computer to execute an input process of inputting for each participant the number of nods of a participant measured from shot video of the participant, and a participant output process of outputting information of the participant in order according to the number of nods.

Advantageous Effects of Invention

According to this invention, when a lecture or conference is proceeded by video through communication, participants who should be prompted to speak can be expressed without bothering the participants.

DESCRIPTION OF EMBODIMENTS

Hereinafter, exemplary embodiments of the present invention will be explained with reference to the drawings.

Figure 1:
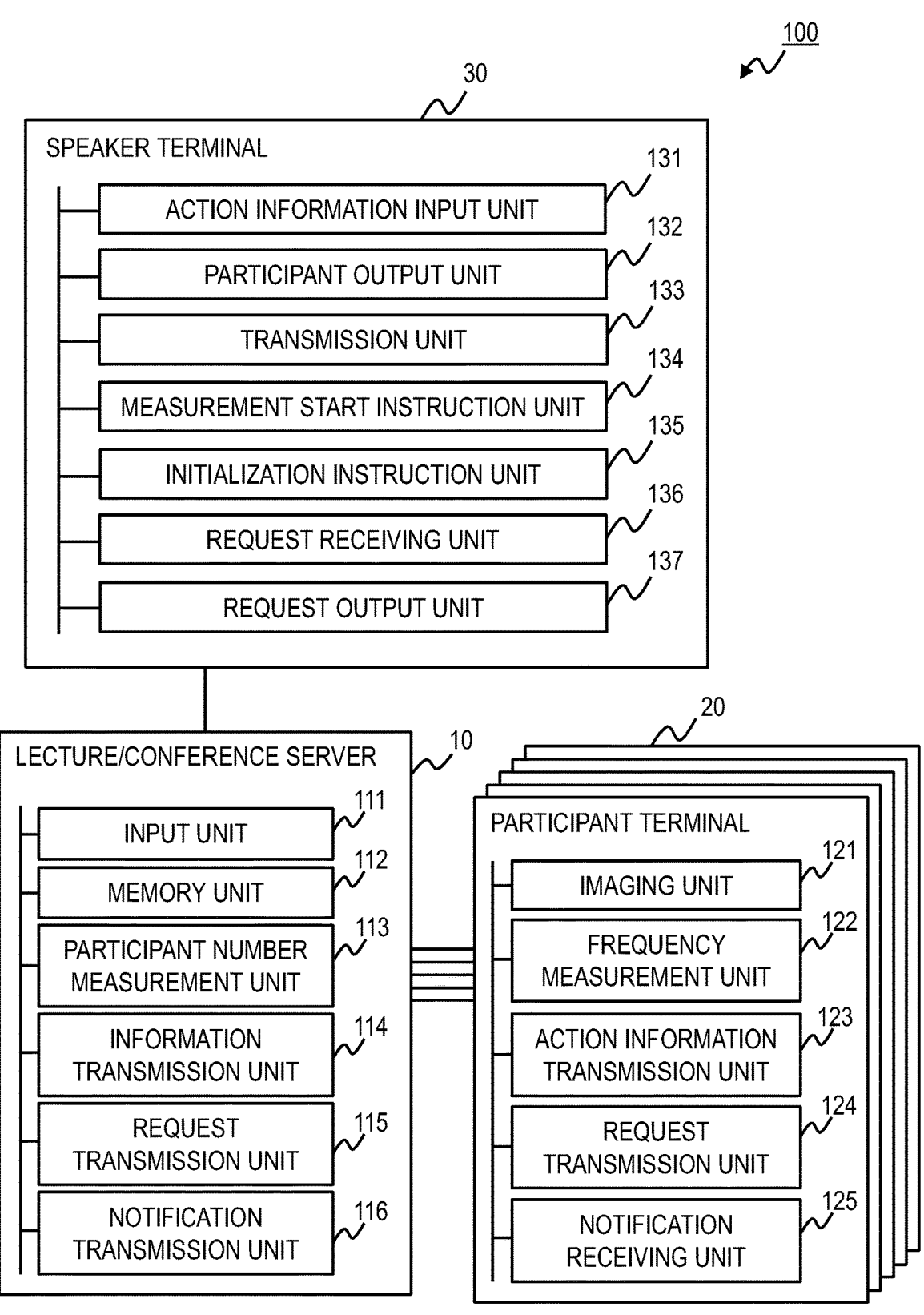
FIG. 1 It depicts a block diagram showing a configuration example of an exemplary embodiment of the communication system according to the present invention.

FIG. 1 is a block diagram showing a configuration example of an exemplary embodiment of the communication system according to the present invention. Since the communication system of the present invention can be used for remote lectures/conferences, this exemplary embodiment illustrates a remote lecture/conference system as an example of a communication system. The remote lecture/conference system 100 illustrated in FIG. 1 includes a lecture/conference server 10 and a plurality of terminals.

The plurality of terminals includes a plurality of participant terminals 20 used by participants in a lecture or conference and a speaker terminal 30 used by a speaker in the lecture or conference. In this exemplary embodiment, it is assumed that the participants and the speaker are distinct, and that the participants use the participant terminals 20 and the speaker uses the speaker terminal 30. However, it is not necessary to distinguish between participants and the speaker. It may be a situation where a participant becomes a speaker or a speaker becomes a participant depending on the situation. Therefore, the participant terminal 20 may have the function of the speaker terminal 30, and the speaker terminal 30 may have the function of the participant terminal 20.

The participant terminal 20 includes an imaging unit 121, a frequency measurement unit 122, an action information transmission unit 123, a request transmission unit 124, and a notification receiving unit 125.

The imaging unit 121 is a device that shoots video of a participant using the participant terminal 20. The imaging unit 121 is realized by a camera, for example. The imaging unit 121 may be built in the participant terminal 20 or may be a device externally connected to the participant terminal 20.

The frequency measurement unit 122 measures the number of actions of the participant from the video of the participant that was shot. In this exemplary embodiment, the frequency measurement unit 122 measures the number of nods of the participant from the video of the participant. The frequency measurement unit 122 may also measure the number of claps of the participant from the video of the participant.

The greater the number of detected nods, the higher the level of understanding of the participant is estimated to be. On the other hand, the lower the number of detected nods, the lower the level of understanding of the participant is presumed to be. The greater the number of detected claps, the higher the evaluation of the lecture or conference is presumed to be. On the other hand, the lower the number of detected claps, the lower the evaluation of the lecture or conference is presumed to be.

The method by which the frequency measurement unit 122 measures the number of actions of a person from the video is arbitrary. Since the method of image-recognizing actions of a person (for example, clap, nod, etc.) from video and measuring the number of times they are recognized is widely known, a detailed description is omitted here.

Here, the frequency measurement unit 122 may start measuring the number of nods when it receives an instruction to start measuring the number of nods of the participant from the speaker terminal 30 which will be described later. The frequency measurement unit 122 may initialize the number of nods to 0 when an initialization instruction for the number of nods of the participant is received from the speaker terminal 30 which will be described later.

The frequency measurement unit 122 may also detect the presence or absence of a predetermined action from the video of the participant. The frequency measurement unit 122 may detect raising participant's hand from the video of the participant, for example.

The action information transmission unit 123 transmits the action information that the information of the participant is associated with the number of actions to the lecture/conference server 10. In this exemplary embodiment, the action information transmission unit 123 transmits the action information that the information of the participant is associated with the number of nods to the lecture/conference server 10. The action information transmission unit 123 may also transmit action information that the information of the participant is associated with the number of claps to the lecture/conference server 10. Here, the information of the participant includes the shot video of the participant and attributes of the participant (for example, name, gender, age, and history). When the frequency measurement unit 122 detects a predetermined action, the action information transmission unit 123 may transmit the content of the detected action to the lecture/conference server 10.

The action information transmission unit 123 may transmit action information to the lecture/conference server 10 every time action is detected (once per action), or it may transmit action information to the lecture/conference server 10 when the detected number of actions reach a predetermined number, or after a predetermined period of time.

The request transmission unit 124 transmits to the lecture/conference server 10 a request to the speaker terminal 30. In other words, a request from a participant is transmitted by the request transmission unit 124 to the speaker terminal 30 through the lecture/conference server 10 and are recognized by the speaker. The request here includes, for example, a request to speak or a request to ask a question. The request transmission unit 124 may also transmit a request directly to the speaker terminal 30. However, transmitting the request through the lecture/conference server 10 is preferred because the speaker terminal 30 can be notified of the request with various information added.

The notification receiving unit 125 receives notifications from the speaker terminal 30. More specifically, the notification receiving unit 125 receives notifications from the speaker terminal 30 through the lecture/conference server 10. For example, the notification receiving unit 125 may receive a notification indicating that the speaker has been nominated by the speaker. The notification receiving unit 125 may receive the notification directly from the speaker terminal 30.

The frequency measurement unit 122, the action information transmission unit 123, the request transmission unit 124, and the notification receiving unit 125 are realized by a processor (for example, CPU (Central Processing Unit)) of a computer that operates according to a program. For example, the program may be stored in a memory (not shown) in the participant terminal 20, and the processor may read the program and operate as the frequency measurement unit 122, the action information transmission unit 123, the request transmission unit 124, and the notification receiving unit 125 according to the program. The functions of the frequency measurement unit 122, the action information transmission unit 123, the request transmission unit 124, and the notification receiving unit 125 may be provided in a SaaS (Software as a Service) format.

Each of the frequency measurement unit 122, the action information transmission unit 123, the request transmission unit 124, and the notification receiving unit 125 may be realized by dedicated hardware. In addition, some or all of the components of each device may be realized by a general-purpose or dedicated circuit (circuitry), a processor, etc., or a combination thereof. They may be configured by a single chip or by multiple chips connected through a bus. Some or all of the components of each device may be realized by a combination of the above-mentioned circuit, etc. and a program.

When some or all of the components of the participant terminal 20 are realized by multiple information processing devices or circuits, etc., the multiple information processing devices or circuits may be arranged in a centralized or distributed manner. For example, the information processing devices, circuits, etc. may be realized as a client-server system, a cloud computing system, or the like, each of which is connected through a communication network.

The lecture/conference server 10 includes an input unit 111, a memory unit 112, a participant number measurement unit 113, an information transmission unit 114, a request transmission unit 115, and a notification transmission unit 116.

The input unit 111 accepts input of various information from the participant terminal 20 and the speaker terminal 30. When the input unit 111 receives the input of the action information from the participant terminal 20, it may count up the number of actions and store it in the memory unit 112 described below. When the input unit 111 receives an instruction to initialize the count from the speaker terminal 30 which will be described later, it may initialize the number of actions to 0.

The memory unit 112 stores various information necessary for the lecture/conference server 10 to perform processing. Specifically, the memory unit 112 stores the number of actions of the participant (specifically, the number of nods, the number of claps, etc.) measured by the participant terminal 20. For example, the memory unit 112 may have a nod counter that stores the number of nods for each participant terminal 20. The memory unit 112 is realized by a magnetic disk, etc., for example.

The participant number measurement unit 113 measures the number of terminals of participants (hereinafter referred to as the number of detected participants) whose action is detected at least once. Specifically, the participant number measurement unit 113 measures the number of the participant terminals 20 which transmit the action information including one or more action numbers. In this exemplary embodiment, the participant number measurement unit 113 measures the number of terminals which transmit the action information including one or more nods numbers. The participant number measurement unit 113 may measure the number of terminals with a predetermined number of claps (for example, 10 or more) included in the action information. By measuring the number of detected participants, it is possible to grasp the overall response without having to check the facial expressions of all participants.

The information transmission unit 114 transmits the action information received from the participant terminal 20 to the speaker terminal 30. The information transmission unit 114 may transmit the number of detected participants measured by the participant number measurement unit 113 to the speaker terminal 30. When the content of the detected actions of the participant is received from the participant terminal 20, the information transmission unit 114 may transmit the content of the actions to the speaker terminal 30.

The request transmission unit 115 transmits the request from the participant terminal 20 to the speaker terminal 30.

The notification transmission unit 116 transmits a notification (for example, participant nomination) from the speaker terminal 30 to the corresponding participant terminal 20.

The speaker terminal 30 includes an action information input unit 131, a participant output unit 132, a transmission unit 133, a measurement start instruction unit 134, an initialization instruction unit 135, a request receiving unit 136, and a request output unit 137.

The action information input unit 131 accepts input of action information from the lecture/conference server 10.

The participant output unit 132 outputs the information of the participants in order according to the number of nods included in the action information. Specifically, the participant output unit 132 outputs the information of the participants in descending or ascending order of the number of nods. The participant output unit 132 may output the information of the participants in order according to the number of claps included in the action information. Whether the order of output is descending or ascending may be predetermined, or may be determined based on an explicit instruction from the speaker.

For example, when outputting information of participants in ascending order of the number of nods, participants with low levels of understanding can be output first, making it possible to easily nominate participants with low levels of understanding as questioners. This allows the speaker to answer questions from participants with low levels of understanding to raise the overall level of understanding.

Similarly, when outputting information of participants in descending order of the number of nods, participants with high levels of understanding can be output first, making it possible to easily nominate participants with low levels of understanding as questioners. This allows the speaker to answer questions from participants with high levels of understanding to further improve their understanding.

When the number of detected participants is received from the lecture/conference server 10, the participant output unit 132 may output the number of detected participants.

The transmission unit 133 transmits to the lecture/conference server 10 the notification to the participant terminal 20. In other words, the notification from the speaker is transmitted by the transmission unit 133 to the participant terminal 20 through the lecture/conference server 10 and is recognized by the participants.

The measurement start instruction unit 134 instructs the participant terminal 20 through the lecture/conference server 10 to start measuring the participant's actions. Specifically, the measurement start instruction unit 134 accepts an instruction from the speaker to start measuring the number of nods and the number of claps of the participants and instructs the lecture/conference server 10 to do so. In response to this instruction, the information transmission unit 114 in the lecture/conference server 10 transmits an instruction to start measuring the actions (specifically, an instruction to start measuring the number of nods of the participants) to the participant terminal 20.

The method by which the measurement start instruction unit 134 receives the instruction from the speaker is arbitrary. The measurement start instruction unit 134 may also detect audio indicating an instruction to start measurement and transmit the instruction to the lecture/conference server 10.

The initialization instruction unit 135 instructs the participant terminal 20 through the lecture/conference server 10 to initialize (reset) the number of actions of the participant. Specifically, the initialization instruction unit 135 accepts an instruction from the speaker to initialize the number of nods and the number of claps of the participant and instructs the lecture/conference server 10 to do so. In response to this instruction, the information transmission unit 114 in the lecture/conference server 10 transmits the initialization instruction for the number of actions (specifically, the initialization instruction for the number of nods of the participant) to the participant terminal 20.

The method by which the initialization instruction unit 135 accepts the instruction from the speaker is arbitrary. For example, the initialization instruction unit 135 may detect that a button or a nod reset switch (not shown) that accepts an operation indicating an instruction from the speaker is pressed and transmit the instruction to the lecture/conference server 10. The initialization instruction unit 135 may also detect audio indicating an initialization (reset) instruction and transmit that instruction to the lecture/conference server 10.

The request receiving unit 136 receives requests from the participant terminal 20.

The request output unit 137 outputs the received request from the participant in a manner that is recognizable to the speaker. The request output unit 137 may, for example, instruct an alarm (not shown) to sound when a request is received. This makes it possible to immediately notice that a request has been received.

For example, when the speaker terminal 30 is displaying video of a participant, the request output unit 137 may display the video of the participant who transmitted the request with a red frame. This enables the speaker to confirm at a glance the participant who transmitted the request.

In other cases, when receiving information from the lecture/conference server 10 that a predetermined action (for example, a hand raising action) has been detected, the request output unit 137 may output content in response to that action (for example, information indicating a request to speak). By outputting such information, the participant can communicate the content of the request to the speaker without having to operate a button or the like.

The action information input unit 131, the participant output unit 132, the transmission unit 133, the measurement start instruction unit 134, the initialization instruction unit 135, the request receiving unit 136, and the request output unit 137 are realized by a processor of a computer that operates according to a program (output program). For example, the program is stored in a memory (not shown) in the speaker terminal 30, and the processor may read the program and operate as the action information input unit 131, the participant output unit 132, the transmission unit 133, the measurement start instruction unit 134, the initialization instruction unit 135, the request receiving unit 136, the request output unit 137.

Figure 2:
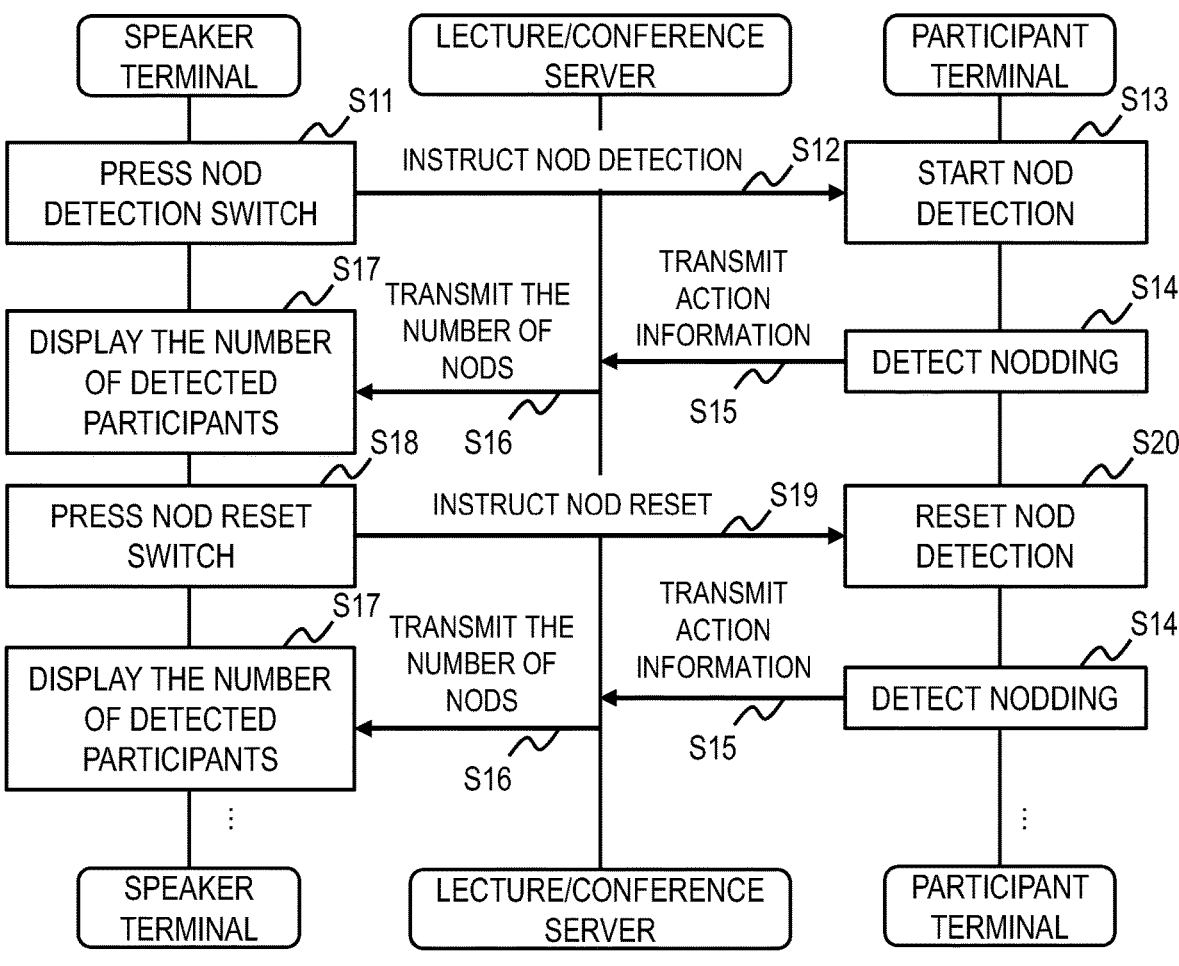
FIG. 2 It depicts a flowchart showing an example of an operation of the remote lecture/conference system.

Next, an operation of the remote lecture/conference system 100 of this exemplary embodiment will be explained. FIG. 2 is an explanatory diagram showing an example of an operation of the remote lecture/conference system 100 of this exemplary embodiment. The lecture/conference server 10 sets the value of a nod counter stored in the memory unit 112 to "0" at the start of the lecture or conference.

When the speaker wishes to grasp a response from the participant, for example, the speaker presses a nod detection switch (step S11) and then guides the participant, "If you have understood up to this point, please nod toward the camera." The measurement start instruction unit 134 detects that the nod detection switch is pressed and transmits an instruction to start measuring the number of nods (hereinafter referred to as the nod detection instruction) to each participant terminal 20 through the lecture/conference server 10 (step S12).

When the participant terminal 20 receives the nod detection instruction, the frequency measurement unit 122 starts nod detection (step S13). When nodding is detected (step S14), the action information transmission unit 123 transmits the action information to the lecture/conference server 10 (step S15).

The input unit 111 in the lecture/conference server 10 measures the number of nods regarding the participant terminal 20 by counting up the nod counter when the action information is received. In addition, the participant number measurement unit 113 measures the number of detected participants who received the action information. Then, the information transmission unit 114 transmits various information to the speaker terminal 30 (step S16). The participant output unit 132 in the speaker terminal 30 displays the action information and the number of detected participants received from the lecture/conference server 10 (step S17).

On the other hand, after the speaker confirms the action information and the number of detected participants, the speaker confirms the number of terminals which the action information transmitted and presses the nod detection reset switch (step S18). The initialization instruction unit 135 detects that the nod detection reset switch is pressed and transmits an instruction to initialize the nod count (hereinafter referred to as the nod reset instruction) to each participant terminal 20 through the lecture/conference server 10 (step S19).

When the participant terminal 20 receives the nodding reset instruction, the frequency measurement unit 122 initializes the number of nods to 0 (step S20). Thereafter, the process from step S14 onward is repeated.

Figure 3:
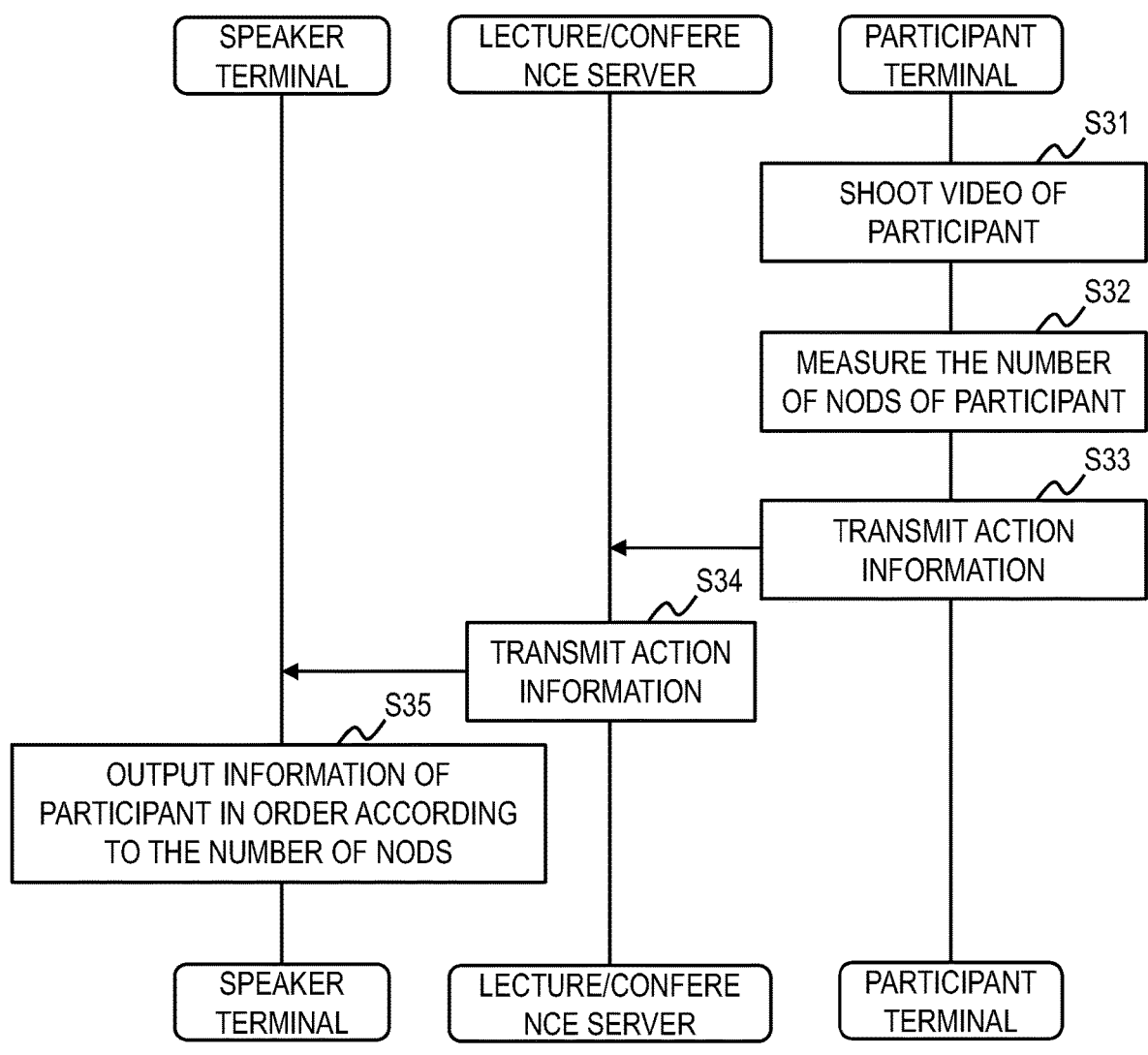
FIG. 3 It depicts an explanatory diagram showing another example of an operation of the remote lecture/conference system.

FIG. 3 is another explanatory diagram showing an example of an operation of the remote lecture/conference system 100 of this exemplary embodiment. The imaging unit 121 in the participant terminal 20 shoots video of the participant (step S31). The frequency measurement unit 122 measures the number of nods of the participant from the shot video (step S32). The action information transmission unit 123 transmits the action information to the lecture/conference server 10 (step S33). The information transmission unit 114 in the lecture/conference server 10 transmits the action information to the speaker terminal 30 (Step S34). Then, the participant output unit 132 in the speaker terminal 30 outputs the information of the participant in order according to the number of nods included in the action information (Step S35).

Next, an operation of nominating a participant from which a question is received will be explained. As the operation illustrated in FIG. 2 is repeated, the number of nods detected at the participant terminal 20 is counted in the nod counter in the memory unit 112.

When the speaker terminal 30 displays the participants, it may display the participants in ascending order of the number of nods. Considering the number of nods as an indicator of level of understanding, by nominating the first participant displayed on the speaker terminal 30 as the questioner, it is possible to nominate the participant with low level of understanding as the questioner.

Conversely, when the speaker terminal 30 displays the participants, it may display the participants in descending order of the number of nods. By nominating the first participant displayed on the speaker terminal 30 as the questioner, it is possible to nominate the participant with high level of understanding as the questioner.

As described above, in this exemplary embodiment, the imaging unit 121 in the participant terminal 20 shoots video of the participant using that participant terminal 20, the frequency measuring unit 122 measures the number of nods of that participant from the shot video, and the action information transmission unit 123 transmits the action information to the lecture/conference server 10. The information transmission unit 114 in the lecture/conference server 10 transmits the action information to the speaker terminal 30, and the participant output unit 132 in the speaker terminal 30 outputs the information of the participants in order according to the number of nods included in the action information. Therefore, in the case of a lecture or conference is performed by video through communication, the participants who should be encouraged to speak can be expressed without bothering the participants.

In other words, the remote lecture/conference system of this exemplary embodiment enables the speaker to confirm the responses from the participants at the same level as in a in-person lecture or conference by detecting actions of the participants, such as nodding or clapping, in the captured images of the participants. In this case, even if the participants are not skilled in operating the remote lecture/conference system, the system can detect natural human actions and confirm their reactions.

Figure 4:
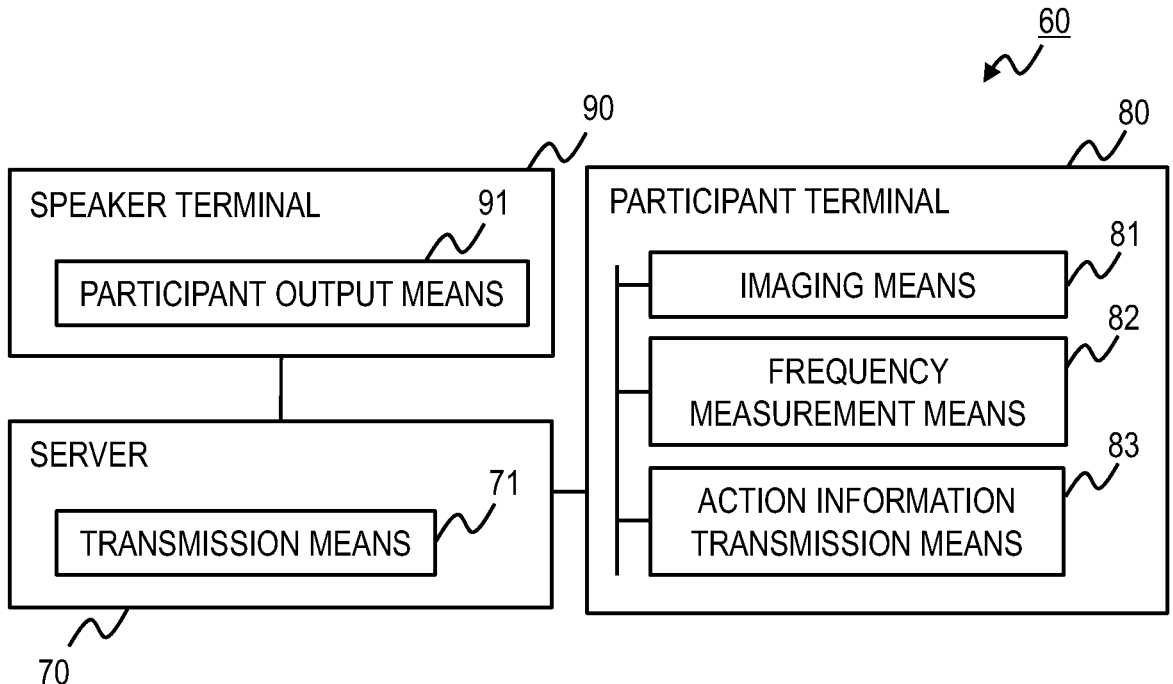
FIG. 4 It depicts a block diagram showing an overview of the communication system according to the present invention.

Next, an overview of the present invention will be explained. FIG. 4 is a block diagram showing an overview of the communication system according to the present invention. The communication system 60 (for example, the remote lecture/conference system 100) according to the present invention includes participant terminals 80 (for example, the participant terminals 20) used by participants of a lecture or conference, a speaker terminal 90 (for example, the speaker terminal 30) used by a speaker of the lecture or conference, and a server 70 (for example, the lecture/conference server 10).

The participant terminal 80 includes imaging means 81 (for example, the imaging unit 121) for shooting video of the participant who uses the participant terminal 80, frequency measurement means 82 (the frequency measurement unit 122) for measuring the number of nods of the participant from the shot video, and action information transmission means 83 (for example, the action information transmission unit 123) for transmitting action information that information of the participant is associated with the number of nods to the server 70.

The server 70 includes transmission means 71 (for example, the information transmission unit 114) for transmitting the action information to the speaker terminal 90.

The speaker terminal 90 includes participant output means 91 (for example, the participant output unit 132) for outputting the information of the participant in order according to the number of nods included in the action information.

Such a configuration makes it possible to express a participant who should be prompted to speak without bothering the participants when a lecture or conference is proceeded by video through communication.

The speaker terminal 90 may include measurement start instruction means (for example, the measurement start instruction unit 134) for instructing to start measuring actions of the participant. The measurement start instruction means may instruct to start measuring the number of nods of the participant to the server 70, the transmission means 71 in the server 70 may transmit an instruction to start measuring the number of nods of the participant to the participant terminal 80, and the frequency measurement means 82 may start measuring the number of nods when receiving the instruction to start measuring.

The speaker terminal 90 may include initialization instruction means (for example, the initialization instruction unit 135) for instructing to initialize the number of actions of the participant. The initialization instruction means may instruct to the server 70 to initialize the number of nods of the participant, the transmission means 71 in the server 70 may transmit an initialization instruction for the number of nods of the participant to the participant terminal 80, and the frequency measurement means 82 may initialize the number of nods of the participant when receiving the initialization instruction.

The participant output means 91 may output the information of the participant in descending or ascending order of the number of nods.

The frequency measurement means 82 may measure the number of claps of the participant from accepted input video. In this case, the action information transmission means 83 may transmit the action information that the information of the participant is associated with the number of claps to the server 70, the transmission means 71 in the server 70 may transmit the action information to the speaker terminal 90, and the participant output means 91 in the speaker terminal 90 may output the information of the participant in order according to the number of claps included in the action information.

The server 70 may include participant number measurement means (for example, the participant number measurement unit 113) for measuring the number of detected participants that is the number of terminals which transmit the action information including one or more nods numbers. The transmission means 71 in the server 70 may transmit the number of detected participants to the speaker terminal 90, and the participant output means 91 may output the number of detected participants.

Figure 5:
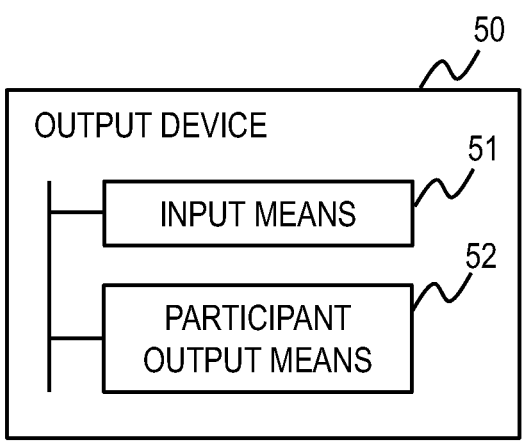
FIG. 5 It depicts a block diagram showing an overview of the output device according to the present invention.

FIG. 5 is a block diagram showing an overview of the output device according to the present invention. The output device 50 (for example, the speaker terminal 30) according to the invention includes input means 51 (for example, the action information input unit 131) for inputting for each participant the number of nods of a participant measured from shot video of the participant, and participant output means 52 (for example, the participant output unit 132) for outputting information of the participant in order according to the number of nods.

Such a configuration also makes it possible to express a participant who should be prompted to speak without bothering the participants when a lecture or conference is proceeded by video through communication.

Although the invention of the present application has been described above with reference to exemplary embodiments and examples, the present invention is not limited to the above exemplary embodiments and examples. Various changes can be made to the configuration and details of the present invention that can be understood by those skilled in the art within the scope of the present invention.

This application claims priority based on Japanese Patent Application No. 2021-40918 filed on Mar. 15, 2021, the disclosure of which is incorporated herein in its entirety.

REFERENCE SIGNS LIST

10 Lecture/conference Server
20 Participant terminal
30 Speaker terminal
100 Remote lecture/conference system
111 Input unit
112 Memory unit
113 Participant number measurement unit
114 Information transmission unit
115 Request transmission unit
116 Notification transmission unit
121 Imaging unit
122 Frequency measurement unit
123 Action information transmission unit
124 Request transmission unit
125 Notification receiving unit
131 Action information input unit
132 Participant output unit
133 Transmission unit
134 Measurement start instruction unit
135 Initialization instruction unit
136 Request receiving unit
137 Request output unit

What is claimed is:

1. A communication system comprising:
participant terminals used by participants of a lecture or conference;
a speaker terminal used by a speaker of the lecture or conference; and
a server,
wherein the participant terminal includes:
imaging means for shooting video of the participant who uses the participant terminal;
frequency measurement means for measuring the number of nods of the participant from the shot video; and
action information transmission means for transmitting action information that information of the participant is associated with the number of nods to the server,
wherein the server includes transmission means for transmitting the action information to the speaker terminal,
wherein the speaker terminal includes participant output means for outputting the information of the participant in order according to the number of nods included in the action information and measurement start instruction means for instructing to start measuring actions of the participant,
wherein the measurement start instruction means transmits an instruction to start measuring the number of nods of the participant to the server,
wherein the transmission means in the server transmits an instruction to start measuring the number of nods of the participant to the participant terminal, and
wherein the frequency measurement means starts measuring the number of nods when receiving the instruction to start measuring.

2. The communication system according to claim 1, wherein
the speaker terminal includes initialization instruction means for instructing to initialize the number of actions of the participant,
the initialization instruction means instructs to the server to initialize the number of nods of the participant,
the transmission means in the server transmits an initialization instruction for the number of nods of the participant to the participant terminal, and
the frequency measurement means initializes the number of nods of the participant when receiving the initialization instruction.

3. The communication system according to claim 1, wherein the participant output means outputs the information of the participant in descending or ascending order of the number of nods.

4. The communication system according to claim 1, wherein
the frequency measurement means measures the number of claps of the participant from accepted input video,
the action information transmission means transmits the action information that the information of the participant is associated with the number of claps to the server,
the transmission means in the server transmits the action information to the speaker terminal, and
the participant output means in the speaker terminal outputs the information of the participant in order according to the number of claps included in the action information.

5. The communication system according to claim 1, wherein
the server includes participant number measurement means for measuring the number of detected participants that is the number of terminals which transmit the action information including one or more nods numbers, the transmission means in the server transmits the number of detected participants to the speaker terminal, and the participant output means outputs the number of detected participants.

6. An output device comprising:

a memory storing instructions; and one or more processors configured to execute the instructions to:

transmit an instruction to start measuring the number of nods of the participant to the server which transmits an instruction to start measuring the number of nods of the participant to the participant terminal which measures the number of nods when receiving the instruction to start measuring;

input for each participant the number of nods of the participant measured from shot video of the participant; and output information of the participant in order according to the number of nods.

7. A communication method performed by a participant terminal used by a participant of a lecture or conference, a server, and a speaker terminal used by a speaker of the lecture or conference, the method comprising:

the speaker terminal sends an instruction to start measuring the number of nods of the participant to the server, the server transmits an instruction to start measuring the number of nods of the participant to the participant terminal, the participant terminal shoots video of the participant who uses the participant terminal, the participant terminal measures the number of nods of the participant from the shot video, wherein the participant terminal starts measuring the number of nods when receiving the instruction to start measuring, the participant terminal transmits action information that information of the participant is associated with the number of nods to the server, the server transmits the action information to the speaker terminal, and the speaker terminal outputs the information of the participant in order according to the number of nods included in the action information.

* * * * *